United States Patent [19]

Notestine

[11] 4,155,267
[45] May 22, 1979

[54] CHANGE SPEED GEARING FOR VEHICLE MOUNTED WINCHES

[76] Inventor: Elmer L. Notestine, 2232 SE. 154th, Portland, Oreg. 97233

[21] Appl. No.: 798,162

[22] Filed: May 18, 1977

[51] Int. Cl.² ............................................. F16H 3/22
[52] U.S. Cl. ................................. 74/342; 180/53 FE
[58] Field of Search ............... 74/339, 342, 425, 341; 254/166, 187.1, 187.6; 280/727; 293/69 R; 180/53 FE

[56] References Cited

U.S. PATENT DOCUMENTS

| | | | |
|---|---|---|---|
| 1,469,002 | 9/1923 | Haubert | 254/166 |
| 3,223,386 | 12/1965 | Frisbie et al. | 74/342 X |

Primary Examiner—Benjamin W. Wyche
Assistant Examiner—Frank H. McKenzie, Jr.
Attorney, Agent, or Firm—Kdisch, Hartwell, Dickinson & Stuart

[57] ABSTRACT

A gear housing arranged for use with a vehicle mounted winch has an input shaft driven by a power supply such as a reversible electric motor. The housing has an output shaft with an output gear thereon meshing with an idler gear journaled in the housing. A shiftable gear assembly is secured on the input shaft for rotation therewith and includes different diameter gears selectively engageable with the idler gear to produce different powered drive speed ratios to the output shaft.

7 Claims, 3 Drawing Figures

CHANGE SPEED GEARING FOR VEHICLE MOUNTED WINCHES

BACKGROUND OF THE INVENTION

This invention relates to new and useful improvements in vehicle mounted winches and more particularly pertains to a change speed gearing for such winches.

Various types of winches have heretofore been provided for mounting on vehicles, particularly at the front of the vehicle, for assisting the vehicle over rough terrain or for hauling in or paying out a load line. One such winch assembly is shown in my U.S. Pat. No. 3,618,898 and another winch of this character is shown in U.S. Pat. No. 4,004,780. These winch assemblies have clutch or gear means to allow disengagement of the drum from the power mechanism so that the line can be drawn out manually at a fast rate. However, powered intake or outlet of the line from the winch is at a uniform speed and such winch mechanisms thus have the disadvantage that only slow movement of the winch line is available in a powered condition of the winch.

SUMMARY OF THE INVENTION

According to the present invention and forming a primary objective thereof a winch assembly is provided having a change speed gearing which is arranged to provide slow or fast powered operation of a winch drum, whereby to be more versatile in use.

In carrying out these objectives, a change speed gear housing includes an input shaft and an output shaft with associated gearing which can be shifted between either a low speed power condition or a higher speed power condition. The present structure is particularly applicable for use on vehicles and is designed in conjunction with winch mechanism which is mostly concealed behind a front bumper and having manual shifting means below the plane of the bumper.

The invention will be better understood and additional objects and advantages will become apparent from the following description taken in connection with the accompanying drawings.

DETAILED DESCRIPTION OF A PREFERRED EMBODIMENT

Figure 1:
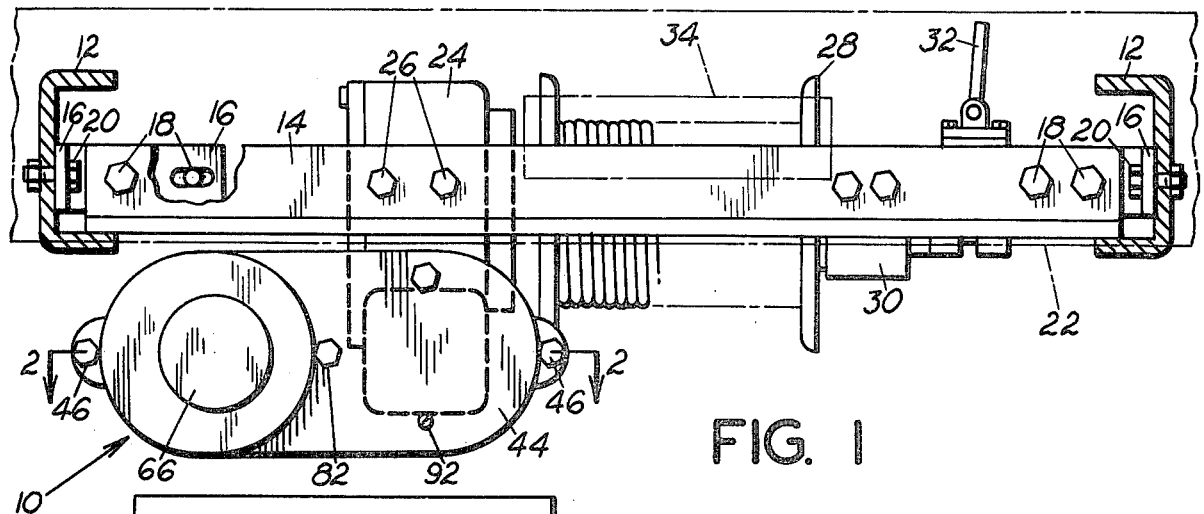
FIG. 1 is a front elevational view of change speed gearing mechanism of the invention as associated with a winch for mounting on a front end of a vehicle.

With particular reference first to FIG. 1, the present change speed gear assembly is designated generally by the numeral 10. Such gear assembly has particular use on vehicles such as on the front end of recreational type vehicles which may at times require assistance from a winch. For purpose of illustration and mounting of the present assembly on a vehicle, the numeral 12 designates longitudinal frame members of a vehicle. A cross bar 14 is secured to the frame members 12, this cross bar being associated with end angle brackets 16 bolted to it by bolts 18 and to the frame members 12 by bolts 20. Such structure preferably is concealed behind the front bumper of the vehicle, the outline of the bumper being designated by broken lines 22.

Cross bar 14 supports a gear reduction unit 24, as by bolts 26, and the output of this gear reduction unit has a drive connection with a winch drum 28 having journaled support at its end opposite from the gear unit 24 by a suitable bearing 30. A shifting lever 32 is associated with the drum 28 providing either powered or free wheeling operation thereof. The bumper has an opening 34 therein to accommodate engagement of the winch line with the drum. Fairlead means, not shown, may also be provided.

The present change speed gear assembly 10 comprises a rear vertical plate 36 removably secured to the gear reduction unit 24 by bolts 38. A shaft 40 which comprises an output shaft of the present gear assembly and the input shaft into gear reduction unit 24, extends through a seal and bearing unit 42 in the plate 36 and has suitable drive connection, not shown, with the shaft of drum 28, usually a worm gear-type drive. A front cover 44 is secured on the vertical plate 36 by means of bolts 46 and has sealed connection with the plate 36 by an O-ring 48.

A gear 50 is keyed on the shaft 40 and comprises the output gear for the present change speed gear assembly. An input shaft 52 from a power source 54 leads into the housing. The power source 54 may comprise a reversible electric motor or a fluid operated motor. Slidably supported on the shaft 52 but keyed for rotation therewith, is a gear assembly comprising a tubular body portion or sleeve 56 having a small pinion gear 58 at one end and a larger gear 60 at the other end. This gear assembly is shiftable between two latched positions, and such latched positions are maintained by spring pressed ball means 62 in the shaft engageable selectively with spaced recesses 64 on the inner surfaces of tubular body portion 56.

Manual shifting of the shifting member 56 from one position to the other is accomplished by a shift handle 66 projecting through a seal 68 in the cover 44 and having a flanged end 70 for secured engagement, as by screws 72, with the end member 56. The two positions of the shifting member are shown in full and broken lines in FIG. 2.

Drive connection between gears 58, 60 and the output gear 50 is established through an idler gear 74 journaled on a spindle 76 having an integral threaded stud extension 78 for bolted connection to the vertical plate 36 and having a tapped bore 80 at the other end for receiving a screw 82. Screw 82 stabilizes the spindle 76 and also serves to hold the cover 44 in place. A sleeve bearing 84 is provided between the spindle 76 and the gear assembly 74. Idler gear assembly 74 has a large gear 86 thereon as well as a small gear 88, the latter gear being disposed in constant mesh with output gear 50. In one shifted position of shiftable member 56, the large gear 86 is engaged by gear 58 and gear 60 runs clear. In the other shifted position of shiftable member 56, gear 60 engages gear 88 and gear 58 runs clear.

Figure 2:
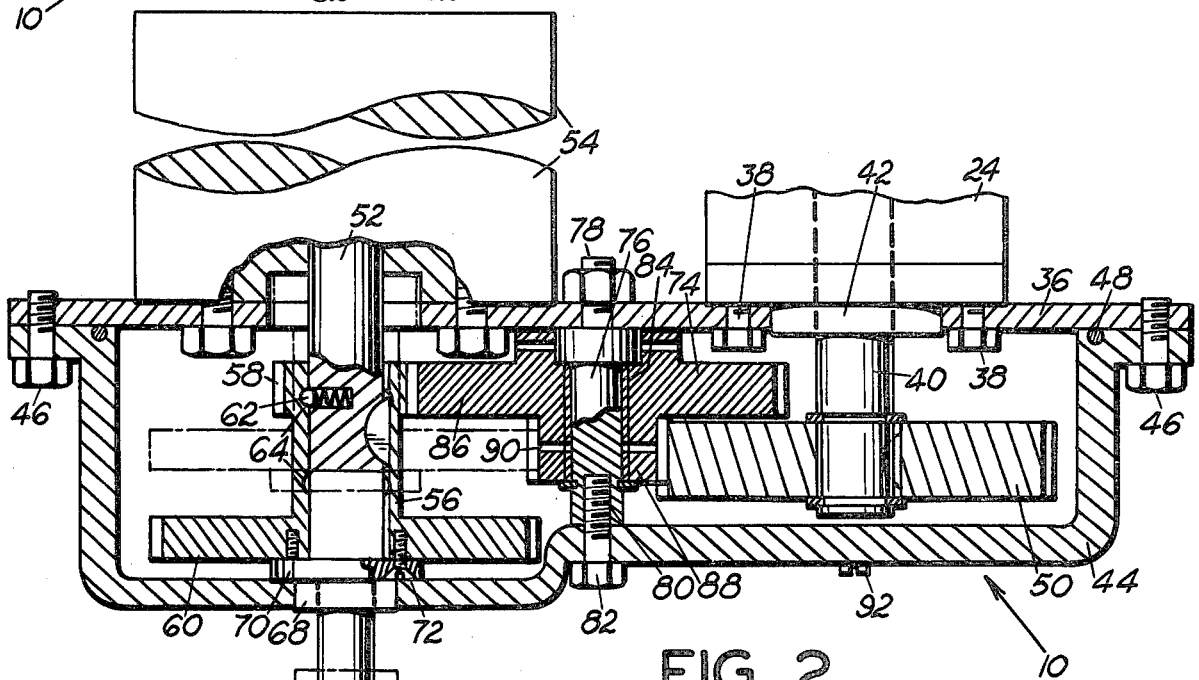
FIG. 2 is an enlarged sectional view taken on the line 2—2 of FIG. 1.
Figure 3:
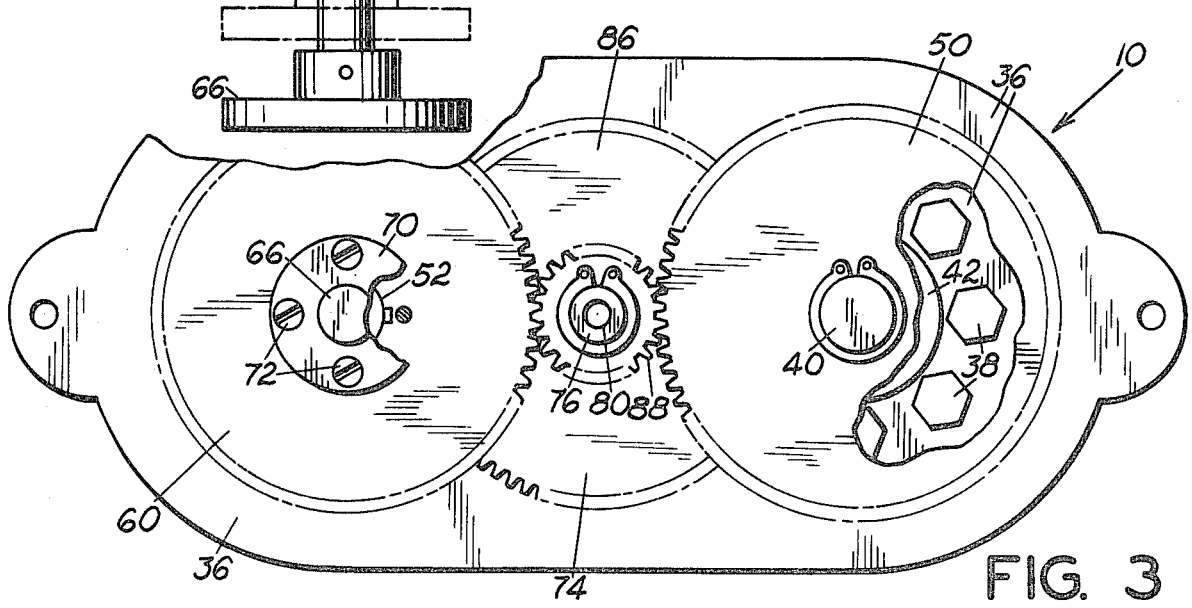
FIG. 3 is an enlarged front elevational view of the change speed gearing housing, a portion of this view being broken away and a front cover of such housing being removed.

Thus, in the operation of the present change speed gear assembly, if it is desired that the winch line be powered for slow operation, either for inward or outward movement, the shiftable member 56 is pulled forwardly to the full line position shown in FIG. 2 so that gear 58 thereon engages gear 86. This produces a slow but powerful drive through the gear reduction between gears 58 and 86 as well as between gears 88 and 50. If it is desired that the winch be used in a faster powered operation, the shiftable member 56 is moved inwardly to the broken line position shown in FIG. 2 to disengage gear 58 from gear 86 and engage gear 60 with gear 88. A faster but still powered drive exists in such shifted position. Thus, with the use of the present change speed gear assembly on a vehicle mounted winch, the winch can be made to operate under three conditions. First it can be made freewheeling by means of the shifting lever 32. In another condition, the winch can provide a slow powered intake or outlet of cable. In the other condition such winch can have faster but still powered intake or outlet of the winch line. The worm gear connection of shaft 40 with the gearing from winch 28 will hold the winch non-rotatably when power is not being applied from motor 54.

With reference to FIG. 2, forced lubricating means is provided to lubricate the area between the spindle 76 and the gear 74. For this purpose, one or more radial passageways 90 extend from the toothed area of gear 88 into the center of the gear. As this gear rotates in mesh with the other gears, the teeth from such other gears force or pump oil into inner bearing surfaces of these elements. Housing 10 has a suitable oil level inspection screw 92.

It is to be understood that the form of my invention herein shown and described is to be taken as a preferred example of the same and that various changes in the shape, size and arrangement of parts may be resorted to without departing from the spirit of my invention, or the scope of the subjoined claims. For example, the invention is illustrated for use in conjunction with the front end of a vehicle. It is to be understood, however, that the winch may be applied to other areas on a vehicle and furthermore may be used for purposes other than with a vehicle.

Having thus described my invention, I claim:

1. A change-speed gearing mechanism for winches comprising
    a housing having a rear vertical plate, a removable cover with a vertical front wall, and means for securing said housing to a support,
    an input shaft in said housing arranged to be connected to a power supply,
    an output shaft in said housing arranged to be connected to a winch drum,
    an output gear secured to said output shaft for rotation therewith,
    an idler gear journaled in said housing in meshing relation with said output gear,
    a shiftable gear assembly mounted on said input shaft for rotation therewith and for relative sliding movement thereon, said assembly including a shift extension handle extending through said front wall of said housing for manual engagement, and
    different diameter gears on said shiftable gear assembly for selected meshing engagement with said idler gear to provide gear ratios of different drive speeds for said output shaft.

2. A change-speed gearing mechanism for winches comprising
    a housing holding a supply of oil used for gear lubrication,
    an input shaft in said housing arranged to be connected to a power supply,
    an output shaft in said housing arranged to be connected to a winch drum,
    an output gear secured to said output shaft for rotation therewith,
    an idler gear journaled in said housing in meshing relation with said output gear, said idler gear having a central bore providing journaled support on a spindle in said housing, and a radial passageway in said idler gear leading from the gear-toothed portion thereof to said bore in the spindle whereby meshing engagement of the teeth of said gear with other ones of said gears drives oil contained within said housing from said gear-toothed portion toward said bore,
    a shiftable gear assembly mounted on said input shaft for rotation therewith and for relative sliding movement thereon, and
    different diameter gears on said shiftable gear assembly for selected meshing engagement with said idler gear to provide gear ratios of different drive speeds for said output shaft.

3. A change-speed gear mechanism for winches comprising
    a housing having a rear vertical plate, a removable cover with a vertical front wall, and means for securing the housing to a support,
    a power supply arranged to be secured to said rear plate,
    an input shaft in said housing supported on and rotatably driven by said power supply,
    an output shaft in said housing arranged to be connected to a winch drum,
    means on said rear plate providing journaled support for said output shaft,
    an output gear secured to said output shaft for rotation therewith,
    an idler gear disposed in meshing relationship with said output gear,
    a shaft secured on said rear wall providing journaled support for said idler gear, with said idler gear, input shaft, and output shaft having mounted support independent of said cover,
    a shiftable gear assembly mounted on said input shaft for rotation therewith and for relative sliding movement thereon, and
    different diameter gears on said shiftable gear assembly for selected meshing engagement with said idler gear to provide gear ratios of different drive speeds for said output shaft.

4. A change-speed gearing mechanism for a winch having a rotatable drum comprising
    a housing having a rear plate and a front wall,
    a power-driven shaft mounted for rotation on said plate,
    a pair of different diameter idler gears mounted in said housing for coupled rotation about a fixed axis paralleling the axis of said shaft,
    means operatively coupling one of said idler gears to said winch drum, and
    a gear assembly mounted for sliding movement longitudinally on said shaft between first and second positions, and keyed for rotation therewith, said gear assembly including first and second gears dimensioned to mesh with one or the other of said idler gears, respectively, when said assembly is moved between its said first and second positions, respectively, and a shift extension handle extending through said housing and operatively coupled to said first and second gears for manual operation to shift said assembly between its first and second positions.

5. The mechanism of claim 4 wherein said handle extends outwardly from said first and second gears through said front wall, along the longitudinal axis of said shaft.

6. The mechanism of claim 4 wherein said idler gears include larger and smaller diameter gears, and said winch drum is operatively coupled to said smaller diameter gear.

7. The mechanism of claim 4 wherein said housing holds a supply of oil and an idler gear has a central bore providing journaled support on a spindle in said housing, and a radial passageway in said idler gear leading from the gear toothed portion thereof to said bore in the spindle whereby meshing engagement of the teeth of said gear with other ones of said gears drives oil contained within said housing from said gear toothed portion toward said bore.

* * * * *